US010597023B2

(12) United States Patent
Aldrich, III et al.

(10) Patent No.: US 10,597,023 B2
(45) Date of Patent: Mar. 24, 2020

(54) AUTOMATIC PRIORITIZATION OF POWERTRAIN OPERATIONS ON SURFACES HAVING A LOW COEFFICIENT OF FRICTION

(71) Applicant: GM Global Technology Operations LLC, Detroit, MI (US)

(72) Inventors: William L. Aldrich, III, Davisburg, MI (US); Aniket P. Kothari, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 122 days.

(21) Appl. No.: 16/011,115

(22) Filed: Jun. 18, 2018

(65) Prior Publication Data

US 2019/0381991 A1 Dec. 19, 2019

(51) Int. Cl.
*B60W 20/12* (2016.01)
*B60K 6/52* (2007.10)
*B60K 6/28* (2007.10)
*B60W 40/06* (2012.01)
*B60W 40/068* (2012.01)
*B60W 50/00* (2006.01)

(52) U.S. Cl.
CPC ............. *B60W 20/12* (2016.01); *B60K 6/28* (2013.01); *B60K 6/52* (2013.01); *B60W 40/068* (2013.01); *B60W 2050/002* (2013.01); *B60W 2050/0022* (2013.01); *B60W 2550/12* (2013.01); *B60W 2550/148* (2013.01)

(58) Field of Classification Search
CPC .............. B60W 20/12; B60W 40/068; B60W 2550/148; B60W 2550/12; B60W 2050/002; B60W 2050/0022; B60K 6/52; B60K 6/28
See application file for complete search history.

(56) References Cited

U.S. PATENT DOCUMENTS 5,431,241 A * 7/1995 May ..................... B60K 28/16
                                                     180/197
9,669,820 B1 * 6/2017 Conlon ................. B60W 10/06

* cited by examiner

*Primary Examiner* — Rodney A Butler
(74) *Attorney, Agent, or Firm* — Quinn IP Law

(57) ABSTRACT

A hybrid powertrain system includes an engine and an electric machine respectively connected to first and second drive axles, with the electric machine decoupled from the engine. The system includes a battery pack and a controller. The controller has slip integrators with a corresponding integrator value for a given one of the drive axles. The integrator values are indicative of an accumulated amount of drive wheel slip over a calibrated duration or window. The integrator values change responsive to axle torque and traction control status signal. The integrator values are added together to derive an integrator sum. Responsive to the integrator sum exceeding a calibrated integrator threshold, the controller executes a control action, including automatically executing a Weather Mode in which energy use of the battery pack is reserved for traction control/propulsion of the vehicle.

20 Claims, 2 Drawing Sheets

AUTOMATIC PRIORITIZATION OF POWERTRAIN OPERATIONS ON SURFACES HAVING A LOW COEFFICIENT OF FRICTION

INTRODUCTION

Hybrid powertrains use multiple torque generating devices to generate and deliver torque to a coupled load. The torque generating devices may include an internal combustion engine and one or more electric traction motors. Engine torque may be used to generate electricity and actively charge an onboard propulsion battery pack in some hybrid powertrains. The battery pack energizes the electric traction motor(s), which in turn are coupled to one or more drive axles or drive wheels. The traction motor(s) may be decoupled from the engine in some powertrain configurations, in which case engine charging of the battery pack is not available. The battery pack in such a configuration is instead recharged by contact between the drive wheels and a road surface, with the traction motor operating as an electric generator during periods of negative motor torque.

SUMMARY

Disclosed herein is a hybrid powertrain system having a high-voltage propulsion battery pack, an internal combustion engine, and an electric machine. As used herein, the term "high-voltage" refers to voltages exceeding auxiliary voltage levels, which are nominally 12-15 volts for an example automotive application. The engine and electric machine are coupled to different drive axles, such as rear and front drive axles, respectively. Additionally, the electric machine and the engine are decoupled from each other, i.e., a power flow path does not exist between the engine and electric machine/battery pack. As a result, engine-driven charging of the battery pack via the electric machine is not available.

The hybrid powertrain system also includes a controller. The controller prioritizes power output and charging of the battery pack over other energy requirements whenever a vehicle employing the powertrain system operates on a road surface having a low coefficient of friction. Such a surface, referred to colloquially as a "low-$\mu$" surface, may be ice or snow covered, wet, oily, or otherwise slippery, and thus prone to inducing slip of drive wheels in contact with the road surface. The controller automatically executes such power flow control in real-time via execution of instructions embodying the method described herein.

Executing the instructions causes the controller to modify control inputs without requiring an operator's affirmative request to do so. Since the engine is decoupled from the electric machine it may be difficult, absent the present approach, to reserve or conserve battery energy for traction control/propulsion purposes over extended periods of positive torque request and at the same time employ available motor torque to offset fuel consumption by the engine. The disclosed method is intended to address such potential power consumption and power allocation issues while operating on the above-noted low-$\mu$ surface.

A hybrid powertrain system according to an example embodiment includes an engine and electric machine respectively connected to first and second drive axles. As noted above, the electric machine is decoupled from the engine. A high-voltage propulsion battery pack is connected to the electric machine via a power inverter module (PIM). The battery pack may also be connected to an auxiliary battery via a DC-DC power converter referred to herein as an auxiliary power module (APM).

The controller includes multiple slip integrators, i.e., logic-based signal value accumulators, with a given slip integrator and associated integrator value corresponding to the first and second drive axles, respectively. The integrator values change responsive to a reported axle torque and an enable status of a traction control system of a vehicle having the hybrid powertrain system, with the enable status changing to a binary on or TRUE status during slip events. The controller adds the integrator values for the drive axles to derive an integrator sum. Responsive to the integrator sum (total value of the integrators) exceeding a calibrated integrator threshold, the controller executes one or more corresponding control action with respect to the powertrain. For instance, the controller may optionally consider multiple different thresholds of increasing slip severity, and then progressively execute different control actions tied to crossing the particular thresholds. The control action (or actions) establishes a powertrain operating mode that allocates electrical energy from the battery pack solely in support of traction control/propulsion functions, and possibly takes other actions supportive of such allocation.

The controller may calculate a slip gain value as a function of the reported axle torque and a calibrated slip threshold. The slip gain value may be positive when axle torque is less than or equal to the calibrated slip threshold. The controller increases the slip integrator values by an amount of the slip gain value when the enable status signal is on/TRUE, i.e., when slip is detected and the slip gain value is positive. Conversely, the slip gain value may be negative when axle torque exceeds the calibrated slip threshold. For this condition, the slip gain value will be applied to reduce the value of the slip integrator.

The control action may include temporarily powering the auxiliary power load solely via the engine, e.g., via an alternator, without using an APM and power from the high-voltage battery pack.

The controller may be optionally configured to adjust the slip threshold in real-time responsive to, e.g., a speed of a windshield wiper motor and/or a temperature signal from an ambient temperature sensor.

In an optional embodiment, the first and second drive axles may be rear and front drive axles, respectively.

The control action may include increasing a state of charge target threshold of the battery pack by at least 30 percent relative to a default level used during ordinary operating modes.

The control action may include disabling engine stop-start functions which require power allocation from the high-voltage power pack, thereby conserving energy for use in traction control/propulsion events. In addition to or in the alternative, the control action may include disabling electrical "propulsion boost" functions which assist torque from the engine purely to improve fuel economy. An example of such electric boost actions that boost fuel economy is that of electric propulsion boost to extend Active Fuel Management (AFM) operation.

The above features and advantages and other features and advantages of the present disclosure are readily apparent from the following detailed description of the best modes for carrying out the disclosure when taken in connection with the accompanying drawings.

Figure 1:
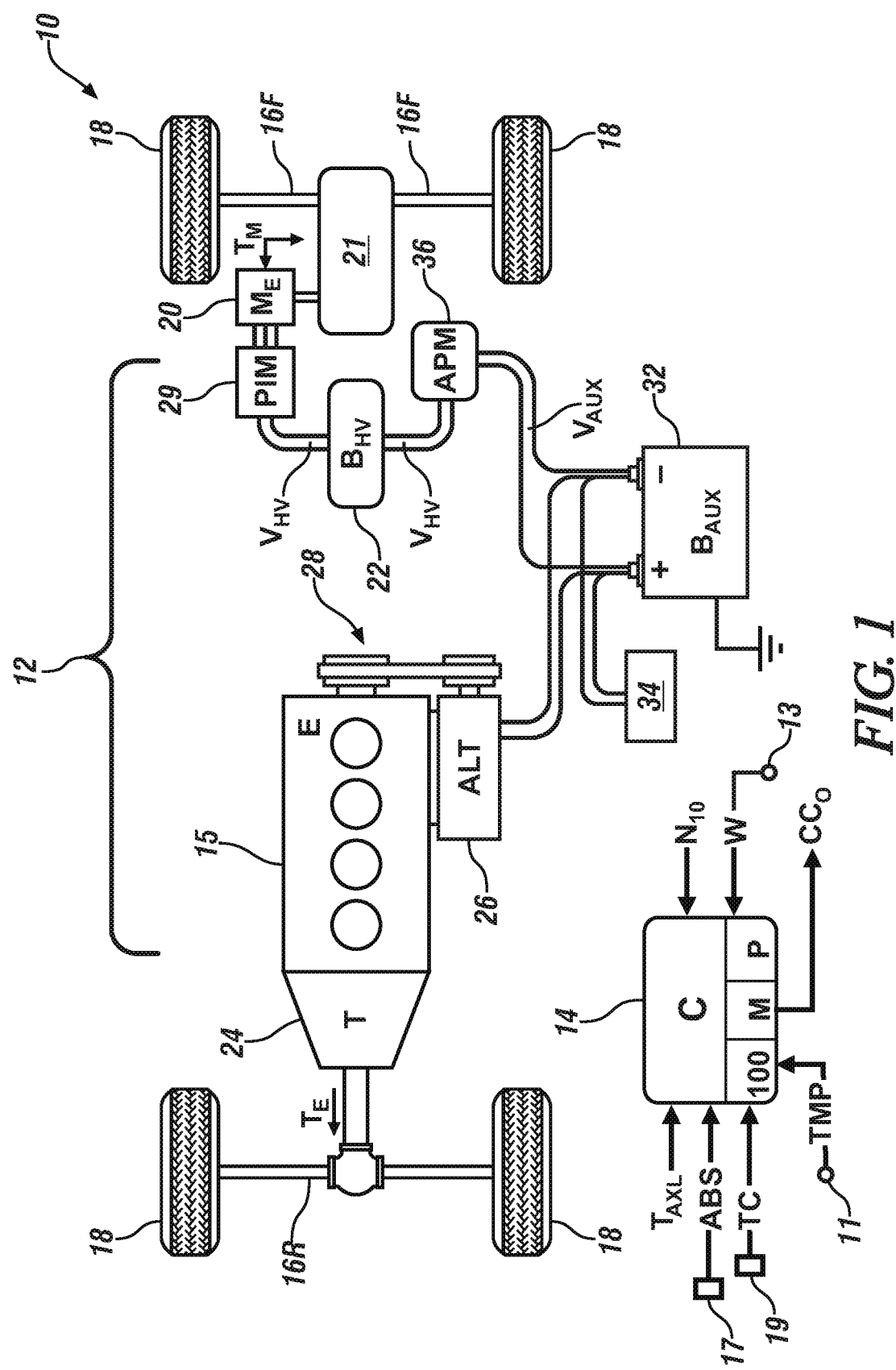
FIG. 1 is a schematic illustration of an example vehicle having a hybrid powertrain system with a controller configured to prioritize powertrain operations on surfaces having a low coefficient of friction as set forth herein.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

Embodiments of the present disclosure are described herein. The various embodiments are examples of the present disclosure, with other embodiments in alternative forms being conceivable by one of ordinary skill in the art in view of the disclosure. The figures are not necessarily to scale. Some features may be exaggerated or minimized to show details of particular components. Therefore, specific structural and functional details disclosed herein are not to be interpreted as limiting, but rather as a representative basis for teaching one skilled in the art to variously employ the present disclosure.

As those of ordinary skill in the art will also understand, features illustrated and described with reference to a given one of the figures may be combinable with features illustrated in one or more other figures in order to produce embodiments that are not explicitly illustrated or described. The combinations of features illustrated thus serve as representative embodiments for typical applications. Various combinations and modifications of the features consistent with the teachings of this disclosure, however, could be desired for particular applications or implementations.

Referring to the drawings, wherein like reference numbers refer to like components, a vehicle 10 is schematically depicted in FIG. 1. The vehicle 10 includes a hybrid powertrain system 12 whose operation is controlled in real-time by a controller (C) 14. The physical location of the controller 14 may be anywhere within the system 12, e.g., collocated with a power inverter module (PIM) 29 and/or an electric machine ($M_E$) 20 having traction motor (positive torque) and electric generator (negative torque) capabilities.

The powertrain system 12 includes multiple sources of torque for propulsion. In the example embodiment of FIG. 1, for instance, which schematically depicts a P4-type powertrain configuration, the torque sources include an internal combustion engine (E) 15 and the electric machine 20. The engine 15 is configured to combust gasoline, diesel, ethanol, or biofuel to generate engine torque (arrow $T_E$). The electric machine 20 separately generates torque (double-headed arrow $T_M$) when energized over a high-voltage bus ($V_{HV}$) by a high-voltage battery pack ($B_{HV}$) 22, i.e., positive or negative torque depending on whether the electric machine 20 is operating as a motor or a generator, respectively, with the battery pack 22 electrically connected to the electric machine 20. "High-voltage", as noted above, refers to voltage levels exceeding 12-15 volts, e.g., 30-300V or more depending on the configuration of the electric traction motor 20.

The vehicle 10 shown in FIG. 1 includes rear and front drive axles 16R and 16F, respectively, each of which is mechanically coupled to drive wheels 18. The motor torque (double-headed arrow $T_M$) may be delivered to the front drive axle 16F via a transaxle arrangement 21 in the exemplary embodiment of FIG. 1, without being limited to such a configuration. The hybrid powertrain system 12 provides an all-wheel drive capability in which, in the illustrated exemplary embodiment, the engine 15 is connected to the rear drive axle 16R and the electric machine 20 is connected to the front drive axle 16F. The locations of the engine 15 and electric machine 20 may be reversed in other embodiments, that is, with the engine 15 being connected to the front drive axle 16F and the electric machine 20 being connected to the rear drive axle 16R. Alternatively, the electric machine 20 may be embodied as a wheel hub motor disposed on the drive wheels 18 of whichever drive axle 16F or 16R is not coupled to the engine 15. The engine 15 and the electric machine 20 are decoupled from each other such that engine torque (arrow $T_E$) is not available for charging the battery pack 22.

The representative hybrid powertrain system 12 of FIG. 1 may include a transmission (T) 24 which receives and transfers engine torque (arrow $T_E$) to the connected drive axle, e.g., the rear drive axle 16R, via a planetary gear arrangement (not shown). Although omitted from FIG. 1 for illustrative clarity and simplicity, a hydrodynamic torque converter or an input clutch and damper assembly may be disposed between the engine 15 and the transmission 24 to connect and disconnect the engine 15 from the transmission 24.

The engine 15 may be connected to an alternator (ALT) 26 via a drive arrangement 28, shown as a belt and pulley assembly. The alternator 26 is an engine-driven electric generator. In generator mode, the alternator 26 outputs an auxiliary charging voltage to positive and negative terminals (+,-) of an auxiliary battery ($B_{AUX}$) 32 over an auxiliary voltage bus ($V_{AUX}$), with operation of the alternator 26 thereby maintaining a state of charge of the auxiliary battery 32 and/or supplying an auxiliary voltage to connected auxiliary loads 34 as needed, e.g., a low-voltage electrical bus, connected lighting effects, windshield wiper motors 13 or washer fluid pumps, an entertainment system, etc.

In some embodiments, the battery pack 22 may be embodied as a high-voltage energy storage system such as a lithium ion or nickel-metal hydride propulsion battery pack. The auxiliary battery 32 in such an embodiment may be electrically connected to the battery pack 22 via an auxiliary power module (APM) 36, which is a direct current to direct current (DC-DC) voltage converter operable for reducing a bus voltage from the battery pack 22 and the high-voltage bus ($V_{HV}$) to auxiliary levels suitable for charging the auxiliary battery 32 or powering the auxiliary loads 34.

The controller 14 is programmed to execute instructions embodying a method 100, an example of which is described in detail below with respect to FIGS. 2 and 3. The controller 14 may be an integral portion of, or a separate module operatively connected to, other electronic controllers or control processors of the vehicle 10. The controller 14 may include a processor (P) and memory (M), i.e., transitory and non-transitory (e.g., tangible) memory that participates in providing data or instructions in a form that may be read by the processor (P). Data and instructions may be transmitted by one or more transmission media or transfer conductors, e.g., a controller area network bus.

When executing the method 100, the controller 14 detects operation of the vehicle 10 on a low-µ surface and uses axle torque-based slip integration as a prelude to executing powertrain control actions as set forth below. That is, when slip is detected and continues for a period of time, the controller 14 responsively executes various control actions or combinations thereof to automatically command what is referred to herein as "Weather Mode". When operating in Weather Mode, the energy/state of charge of the battery pack 22 is reserved/conserved and allocated in support of propulsion and traction control purposes to the exclusion of powering other high-voltage functions. To this end, the controller 14 receives control inputs and generates various control outputs in real-time, i.e., during ongoing operation of the hybrid powertrain system 12.

As set forth below, the controller 14 includes a pair of slip integrators as part of its programmed logic, with a separate integrator value calculated for each respective one of the front and rear drive axles 16F and 16R. The integrator values change over time responsive to a reported axle torque (arrow $T_{AXL}$) of the vehicle 10 and traction control status signal (arrow TC) enabling operation of a traction control system 19, with the traction control system 19 triggered or activated when slip is detected. While the traction control system 19 is shown schematically for illustrative simplicity, those of ordinary skill in art will appreciate that such a traction control system 19 may automatically cycle vehicle brakes (not shown) of one or more of the drive wheels 18 to reduce wheel speed and lessen wheel slip, and/or may reduce allocation of torque from the engine 15 and/or the electric machine 20 to a slipping drive wheel 18. The controller 14 thus looks to the logic state of such a traction control system 19 in determining when to start modifying the integrator values, as set forth below. For illustrative simplicity, the controller 14 is shown apart from the powertrain system 12. However, in order to perform the disclosed functions, the controller 14 may be optionally positioned between the battery pack 22 and the electric machine 20, e.g., integrated with the PIM 29 or as a motor control processor or separate control module.

The controller 14 is configured to add together the integrator values of the respective front and rear drive axles 16F and 16R and thereby derive an integrator sum. Responsive to the integrator sum exceeding a calibrated integrator threshold, the controller 14 executes one or more control actions with respect to the hybrid powertrain system 12, including controlling or changing operating modes, possibly including control of certain functionality of the engine 15 as explained below, and conserving energy levels or state of charge of the battery pack 22 so as to support traction and propulsion functions of the vehicle 10. The controller 14 may optionally consider multiple different thresholds of increasing slip severity, and then progressively execute different control actions tied to crossing the particular thresholds.

More specifically, the controller 14 determines or receives the reported axle torque (arrow $T_{AXL}$), the traction control status signal (arrow TC), vehicle speed (arrow Nio), and possibly an anti-lock braking system status signal (arrow ABS) from an ABS system 17. The controller 14 may optionally receive additional information, such as ambient temperature signal (arrow TMP) from an ambient temperature sensor 11 and/or weather-related information (arrow W), e.g., road conditions or a speed of the windshield wiper motor 13, with the controller 14 possibly modifying a control action using the additional information, e.g., tuning or adjusting a slip threshold in real-time as set forth below. Execution of the method 100 causes the controller 14 to generate control signals (arrow CCo) that ultimately control operation of the hybrid powertrain system 12, i.e., change an operating state of the system 12. A particular implementation of the method 100 will now be described with reference to FIGS. 2 and 3.

Figure 2:
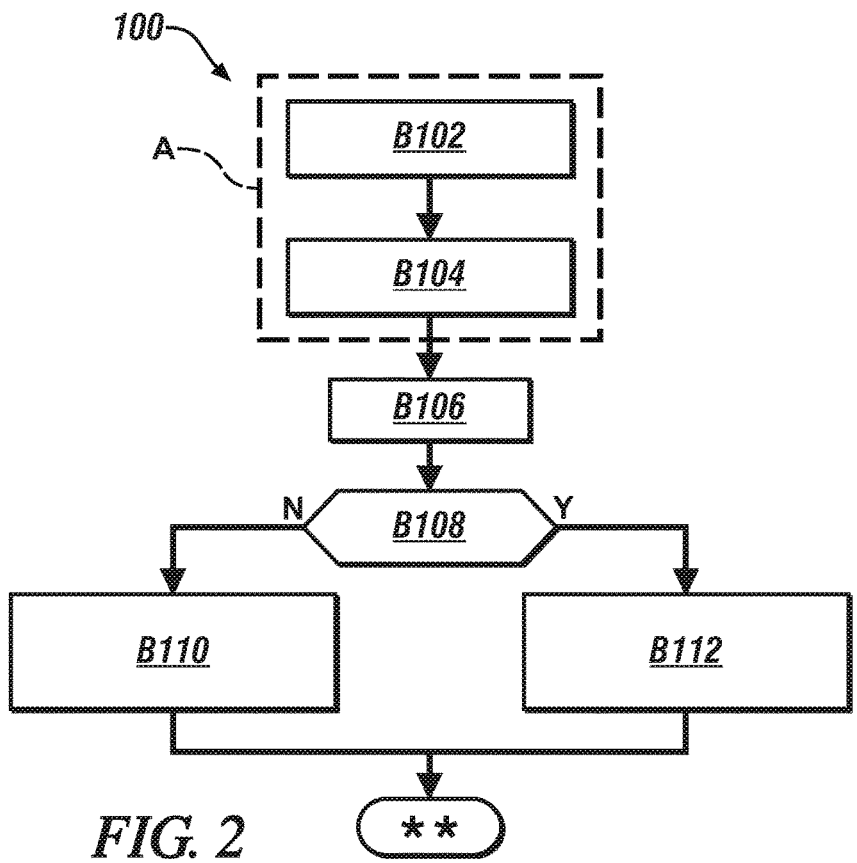
FIGS. 2 and 3 are schematic flow diagrams that, taken together, describe a method that is executable by the controller of FIG. 1.

Referring to FIG. 2, the method 100 commences with startup and initialization of the controller 14 of FIG. 1 and continues to logic blocks B102 and B104. Logic blocks B102 and B104, each of which may be executed using subprocess A of FIG. 3, include initiating a corresponding slip integrator for the respective front and rear drive axles 16F and 16R of FIG. 1, i.e., two slip integrators each corresponding to a given one of the drive axles 16F or 16R. As will be appreciated, the term "integrator" as used in a logic control loop is a logic element that integrates, i.e., accumulates or sums the values of, a particular signal value over a given sampling time window. Within the controller 14 of FIG. 1, the signal value that is accumulated is a calculated slip gain during periods of slip of the drive wheels 18 on a low-μ road surface, e.g., with such slip determined by the traction control system 19 of FIG. 1. The integrators are incremented or decremented in real-time based on various conditions.

Figure 3:
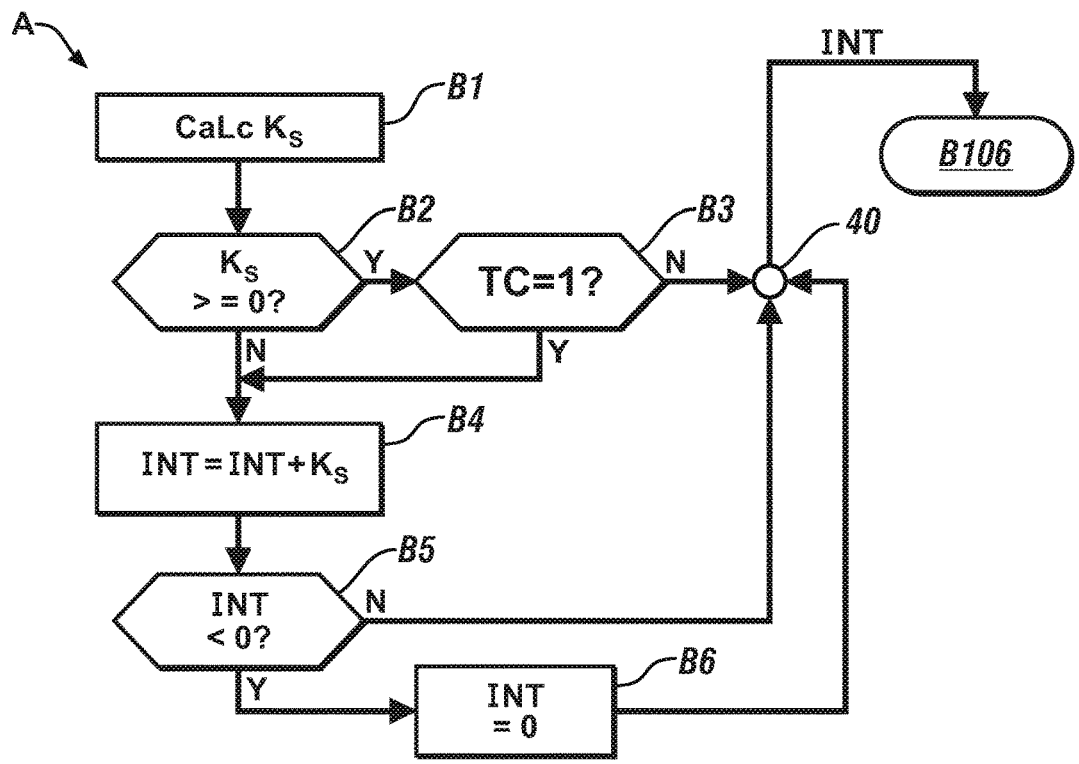

One possible approach for implementing the logic blocks B102/B104 is the subprocess A shown in FIG. 3. At logic block B1, the controller 14 of FIG. 1 calculates a slip gain value (calc $K_S$) as a function of a calibrated slip threshold and the above-noted reported axle torque (arrow $T_{AXL}$ of FIG. 1), with the calibrated slip threshold being a predetermined torque threshold below which a traction control event is active and the slip integrator increments. The calibrated slip threshold may be a function of and/or vary with respect to changes in the vehicle speed (arrow $N_{10}$ of FIG. 1). That is:

$$K_S = (\text{Slip Threshold} - T_{AXL})/\text{Slip Threshold}$$

with the slip gain value ($K_S$) being positive when the reported axle torque, represented above as $T_{AXL}$, is less than the calibrated slip threshold and negative when the reported axle torque exceeds such a threshold, and with the axle torque being the absolute value of the axle torque value reported to the controller 14.

Logic block B1 proceeds to logic block B2, where the controller 14 next determines if the slip gain value ($K_S$) calculated via logic block B2 is zero or higher, i.e., if $K_S \geq 0$. The method 100 proceeds to logic block B3 when the slip gain value equals or exceeds zero. Logic block B4 is executed in the alternative when the slip gain value is negative.

Logic lock B3 may include determining whether traction control is active ("TC=1?") aboard the vehicle 10, i.e., using the traction control status signal (arrow TC) shown in FIG. 1. This logic block possibly entails receipt of a Boolean value or TRUE/1 bit flag from the traction control system 19, with such a Boolean being indicative of such a traction control system 19 actively controlling slip via automatic axle torque changes. Logic block B3 proceeds to logic block B4 when traction control is active. However, when traction control is inactive, a zero value is fed forward to node 40.

Logic block B4 includes modifying the value of the slip integrator value (INT) for a particular one of the drive axles 16F or 16R by the amount of the slip gain value ($K_S$) from logic block B1 ("INT=INT+$K_S$") before proceeding to block B5. Based on the sign of the slip gain value ($K_S$), the integrator will increment or decrement accordingly.

At logic block B5, the controller 14 next determines if the slip integrator value has a negative value ("INT<0?"). The controller 14 proceeds to logic block B6 when the integrator value is negative. When the slip integrator has a zero or positive value, this value is fed into node 40.

Logic block B6 includes setting the value of the slip integrator to zero ("INT=0") and then passing this value to node 40.

At node 40 of FIG. 3, logic blocks B3, B5, and B6 output ("**") the value of the integrators for a given window of time. The logic flow of blocks B102/B104 ensures that the slip integrator value is incremented (increased in a positive direction) specifically when traction control is active and the reported axle torque is below a calibrated slip threshold. The slip integrator decrements, i.e., counts downward, when the reported axle torque exceeds the calibrated slip threshold, meaning that sufficient traction is deemed to be present.

In a possible embodiment, the integrators for drive axles 16F and 16R may be limited to positive values (including zero), with the integrators also having a maximum value. That is, during extended traction events in the presence of slip, without such a maximum value in place as a limit on the integrators, it may take an undesirably long amount of time for the integrators to count down/decrement when road conditions eventually improve sufficiently for deactivating the traction control system 19. Thus, the method 100 may include limiting the integrator value to a calibrated maximum.

Referring once again to FIG. 2, logic block B106 receives the outputs from subprocess A of the integrators for the respective front and rear drive axles 16F and 16R and adds the values of the two integrators together before proceeding to logic block B108.

At logic block B108, the controller 14 of FIG. 1 next determines whether the sum from logic block B106 exceeds one or more calibrated integrator sum thresholds. Block 108 may optionally include the use of multiple different thresholds of increasing slip severity, with different control actions possibly tied to the particular thresholds. The method 100 proceeds to logic block B110 when none of the thresholds is exceeded. Block B112 is executed in the alternative when one or more of such thresholds are exceeded.

Block B110, which is arrived at when the sum from logic block B106 does not exceed one or more of the calibrated integrator sum thresholds, may include automatically disabling operation in Weather Mode and thereafter defaulting to a nominal powertrain operating status. A "nominal" powertrain operating status may include, for instance, executing a "Fuel Economy" mode in which the controller 14 and/or a dedicated hybrid control module allocates energy to and from the propulsion battery pack 22 to energize the electric machine 20, as well as to power other high-voltage components, such as the APM 36 of FIG. 1 and/or the other high-voltage accessories, e.g., according to cost model that minimizes consumption of fossil fuel by the engine 15.

Block B112 entails executing a control action with respect to the powertrain 12 of FIG. 1. This may include automatically enabling Weather Mode as noted above to conserve high-voltage battery power for use solely in support of traction control events, i.e., providing electric propulsion. Responsive to enabling Weather Mode, the controller 14 may execute various control actions based on the severity determined at block B108, e.g., high, medium, or low severity based on the magnitude or amount by which the slip integrator value exceeds the integrator threshold.

Example control actions responsive to autonomous entry into Weather Mode are specific to the configuration of the hybrid powertrain system 12 with which the method 100 is used. By way of example and not limitation, and using the example hybrid powertrain system 12 of FIG. 1 for reference, the controller 14 may temporarily disable start-stop functionality of the engine 15. The controller 14 may also increase a target state of charge of the battery module 22 from a default target state of charge used during normal operation, i.e., when Weather Mode is not active. For instance, if a default target state of charge is about 50-60 percent of a maximum state of charge, logic block B112 may include increasing the target state of charge by at least 30 percent, e.g., up to 65-78 percent state of charge in a possible embodiment. Such an increased target state of charge may be maintained until, in the process of executing the method 100, the controller 14 ultimately exits Weather Mode.

Other possible control actions include disabling Active Fuel Management (AFM) functionality of the engine 15. One example of this type of functionality is a commanding of active cylinder deactivation while cruising, an event in which some cylinders of the engine 15 of FIG. 1 are not fired in order to reduce fuel consumption.

Also possible is the automatic disabling of low throttle/pedal tip-in logic, i.e., a transient period of electric assist during periods of light throttle in which motor torque (double-headed arrow $T_M$) from the electric machine 20 of FIG. 1 might be commanded in appositive direction (i.e., as motor torque) during a transient delay or lag in torque response from the engine 15. The controller 14 may also disable the APM 36 of FIG. 1, or at least restrict power output of the APM 36 so as to prioritize allocation of energy from the battery pack 22 to the electric machine 20 for the duration of operation in Weather Mode. This may include temporarily powering the auxiliary power load 34 via the engine 15 and the alternator 26 of FIG. 1 and not via the APM 36.

As part of the range of possible control actions contemplated within the scope of logic block B112, the controller 14 of FIG. 1 may modify a through-the-road charging strategy of the battery pack 22. This action may be taken responsive to a threshold at which a traction control event occurs for positive slip of the primary axle, which is the rear drive axle 16R in the non-limiting example of FIG. 1. Such a maneuver may help maximize the available level of charging of the battery pack 22 when slip of the primary axle, e.g., rear axle 16R, is not actively occurring. In other words, a possible control action ensures that the sum of charging torque and primary axle torque is limited to the slip threshold for the primary axle. These and other possible control actions may be envisioned within the scope of the present disclosure.

The detailed description and the drawings are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A hybrid powertrain system for a vehicle having a traction control system, the hybrid powertrain system comprising:
    first and second drive axles each connected to a respective set of drive wheels;
    an internal combustion engine connected to the first drive axle;
    a high-voltage battery pack;
    an electric machine energized by the high-voltage battery pack and coupled to the second drive axle, the electric machine being decoupled from the internal combustion engine such that a power flow path does not exist between the internal combustion engine and the electric machine; and
    a controller having a pair of slip integrators with an integrator value for the first and second drive axles, respectively, the integrator values being indicative of an accumulated slip of the drive wheels over a calibrated window of time and changing responsive to a reported axle torque and an enable status signal from the traction control system, the controller being configured:
        to add the integrator value of the first drive axle to the integrator value of the second drive axle to derive an integrator sum; and
        responsive to the integrator sum exceeding a calibrated integrator threshold, to execute a control action with respect to the hybrid powertrain system, including automatically executing a Weather Mode in which energy use of the high-voltage battery pack is reserved for traction control and propulsion of the vehicle.

2. The hybrid powertrain system of claim 1, wherein the controller is configured to calculate a slip gain value as a function of the reported axle torque and a calibrated slip threshold, with the slip gain value being positive when the reported axle torque is less than or equal to the calibrated slip threshold, and to increase the integrator values by an amount of the slip gain value when the enable status signal is TRUE and the slip gain value is negative.

3. The hybrid powertrain system of claim 1, further comprising an alternator coupled to the internal combustion engine, an auxiliary battery, and an auxiliary power module (APM) connected to the high-voltage battery and an auxiliary power load, wherein the control action includes temporarily powering the auxiliary power load via the internal combustion engine and the alternator and not via the APM.

4. The hybrid powertrain system of claim 1, further comprising a windshield wiper motor, wherein the controller is configured to adjust the calibrated slip threshold in real-time responsive to a speed of the windshield wiper motor.

5. The hybrid powertrain system of claim 1, further comprising an ambient temperature sensor, wherein the controller is configured to adjust the calibrated slip threshold in real-time responsive to a temperature signal from the ambient temperature sensor.

6. The hybrid powertrain system of claim 1, wherein the first and second drive axles are a rear drive axle and a front drive axle, respectively.

7. The hybrid powertrain system of claim 1, wherein the control action includes increasing a state of charge target threshold of the battery pack from a default level by at least 30 percent.

8. The hybrid powertrain system of claim 1, wherein the control action includes temporarily disabling auxiliary start-stop functionality of the internal combustion engine.

9. The hybrid powertrain system of claim 1, wherein the control action includes disabling active fuel management functionality of the internal combustion engine.

10. The hybrid powertrain system of claim 1, wherein the control action includes automatically disabling low throttle tip-in logic, the low throttle tip-in logic being a transient period of electric assist from the electric traction motor during a transient delay or lag in torque response from the engine.

11. A method of controlling a hybrid powertrain system of a vehicle on a low coefficient of friction surface, the hybrid powertrain system including a traction control system, first and second drive axles each connected to a respective set of drive wheels, an internal combustion engine connected to the first drive axle, an electric machine connected to the second drive axle and decoupled from the internal combustion engine, and a high-voltage battery pack connected to the electric machine, the method comprising:
    accumulating slip of the drive wheels on the low coefficient of friction surface, via a controller, using a pair of slip integrators each having an integrator value for a corresponding one of the first and second drive axles, the amount of slip changing responsive to a reported axle torque and an enable status signal from the traction control system;
    adding the integrator value for the first drive axle to the integrator value for the second drive axle to derive an integrator sum; and
    responsive to the integrator sum exceeding a calibrated integrator threshold, executing a control action with respect to the hybrid powertrain system, via the controller, including automatically executing a Weather Mode in which energy use of the high-voltage battery pack is reserved for traction control and propulsion of the vehicle.

12. The method of claim 11, further comprising calculating a slip gain value as a function of the reported axle torque and a calibrated slip threshold, with the slip gain value being positive when the reported axle torque is less than or equal to the calibrated slip threshold; and
    increasing the integrator values by an amount of the slip gain value when the enable status signal is a Boolean 1 or TRUE and the slip gain value is negative.

13. The method of claim 11, wherein the hybrid powertrain system includes an auxiliary power load and an engine-driven alternator, and the control action includes temporarily powering the auxiliary power load solely via the engine-driven alternator.

14. The method of claim 11, wherein the vehicle includes a windshield wiper motor, the method further comprising adjusting the calibrated slip threshold in real-time responsive to a speed of the windshield wiper motor.

15. The method of claim 11, wherein the vehicle includes an ambient temperature sensor, the method further comprising adjusting the calibrated slip threshold in real-time responsive to a temperature signal from the ambient temperature sensor.

16. The method of claim 11, wherein the first and second drive axles are a rear drive axle and a front drive axle, respectively.

17. The method of claim 11, wherein the control action includes increasing a state of charge target threshold of the battery pack from a default level by at least 30 percent.

18. The method of claim 11, wherein the control action includes temporarily disabling auxiliary start-stop functionality of the internal combustion engine.

19. The method of claim 11, wherein the control action includes disabling active fuel management functionality of the engine.

20. The method of claim 11, wherein the control action includes automatically disabling low throttle tip-in logic, the low throttle tip-in logic being a transient period of electric assist from the electric traction motor during a transient delay or lag in torque response from the engine.

* * * * *